United States Patent [19] Treglio

[11] 4,361,761

[45] Nov. 30, 1982

[54] MERGED ION-ELECTRON PARTICLE BEAM FOR SPACE APPLICATIONS

[75] Inventor: James R. Treglio, San Diego, Calif.

[73] Assignee: General Dynamics Convair Division, San Diego, Calif.

[21] Appl. No.: 167,242

[22] Filed: Jul. 10, 1980

[51] Int. Cl.[3] .......................... H01S 1/00; H01S 9/00

[52] U.S. Cl. .................................................. 250/251

[58] Field of Search .................... 250/251; 176/1, 2, 5

[56] References Cited

U.S. PATENT DOCUMENTS 3,116,433 12/1963 Moncrieff-Yeates .................. 176/1
3,846,636 11/1974 Zehr et al. .......................... 250/251
3,859,164 1/1975 Nowak .................................. 176/5

*Primary Examiner*—Bruce C. Anderson
*Attorney, Agent, or Firm*—John R. Duncan; Frank D. Gilliam

[57] ABSTRACT

A method and apparatus for merging electrons and ions in a neutralizer region where both are of equal intensity and velocity and directing the beam at a target to be destroyed. The region for merging the beams comprises a plurality of circular electrodes formed in a convex overlapping configuration with circular apertures for receiving ions from a ion source. A separate set of accelerator-decelerator electrodes is positioned to merge the electron beam into the ions in the beam merging region. After the beam leaves the beam merging region it enters an elongated axial magentic field which compresses the beam as it is directed to an object to be destroyed.

This device may be housed in a satellite capable of being transported into space and moved within a kill radius of an object. The beam density is determined by the choice of ion species and by merging the beams in a low interaction energy environment.

3 Claims, 2 Drawing Figures

ELECTRON BEAM SOURCE
POWER SOURCE
ION SOURCE
SATELITE PLATFORM
MEANS FOR MOVING/ ORIENTING TOWARD TARGET
TARGET

MERGED ION-ELECTRON PARTICLE BEAM FOR SPACE APPLICATIONS

RELATED APPLICATION

U.S. application Ser. No. 62,694 entitled "MERGING BEAM ELECTRON DEVICE FOR EFFICIENT NEUTRALIZATION OF HIGH ENERGY IONS" by Irvin M. Winer et al filed Aug. 1, 1979.

BACKGROUND OF THE INVENTION

1. Prior Art

Related Articles

S. M. Trujillo, R. H. Neynaber, E. W. Rothe, Rev. of Sci. Instr., 37 (1966) 1655–1661. R. E. Neynaber and G. D. Magnuson, J. of Chem Phys., 59 (1973) 825–829. E. E. Carlston and G. D. Magnuson, Rev. of Sci. Instr., 33 (1962) 905–911. K. H. Berkner, W. S. Cooper, K. W. Ehlers, and R. V. Pyle, "Performance of a Developmental 120-KeV, 10-A Deuterium (14-A Hydrogen) Neutral Beam System", Proceedings of the Seventh Symposium on Engineering Problems of Fusion Research, Knoxville, Tenn., Oct. 25–28, 1977, pp. 1405–1407.

2. Field of Invention

The present invention relates, in general, to merged ion-electron particle beams and, in particular to a merged ion-electron particle beam capable of destroying objects from a moveable space platform.

The above U.S. patent application disclosed and claimed an ionization and neutralization method and apparatus for a neutral beam injection system comprising the technique of merging a high energy ion beam with a co-moving electron beam of equal intensity to form neutral particles for injection into a plasma reactor.

This invention also produces the beam by space charge neutralization of an ionic beam with a co-moving electron beam merged with the ion beam such that blow up at high intensities due to coulomb repulsion is prevented. The beam density is determined by the choice of ion species and by merging the beams in a low interaction energy environment. As will be clear from the more detailed discussion hereinafter, the beam is of high density (high dielectric constant) and less susceptible to the earth's magnetic effects over the entire beam path length. It may also be made neutral, depending on choice of ion species, density and interaction energy.

This invention also includes a technique of significantly improving the quality of the emerged ion-electron beam by passing it through an axial magnetic field generated by a long solenoid as it leaves the neutralization region. The magnetic field will compress the beam as well as increase its transverse temperature. Line radiation will cool the free electrons, which in turn will cool the ions. When the beam emerges from the magnetic field, it expands and cools with the net result of providing a beam of very high quality (low emittance) which will travel to a target without enormous spread.

Accordingly it is an object of this invention to provide an apparatus and method for producing a merged ion-electron particle beam which will destroy objects in space and which is capable of producing such beam from a moveable space platform.

This and other objects of this invention will be apparent to those skilled in the art after a review of the drawings and the more detailed description hereinafter.

SUMMARY OF THE INVENTION

The invention which attains the foregoing objects comprises a method and apparatus for merging electrons and ions in a beam merging region where both are of equal intensity and velocity and directing the beam at a target to be destroyed. The region for merging the beams comprises a plurality of circular electrodes formed in a convex overlapping configuration with circular apertures for receiving ions from an ion source and accelerator. A separate set of accelerator decelerator-electrodes is positioned to merge the electron beam into the ions in the beam merging region. Permanent magnets produce a modest magnetic field to assist in the merging of the beam. Once merged, the beam leaves the beam merging region and enters an elongated axial magnetic field which compresses the beam as it is directed to an object to be destroyed.

This device may be housed in a satellite capable of being transported into space and moved within a kill radius of an object and the beam density is determined by the choice of ion species and by merging the beams in a low interaction energy environment. The beams produced by this invention can provide new line-of-sight aiming with energy fluxes near 20 $KW/cm^2$ at distances in excess of a 100 kilometers.

DETAILED DESCRIPTION OF THE INVENTION

Figures 1, 2:
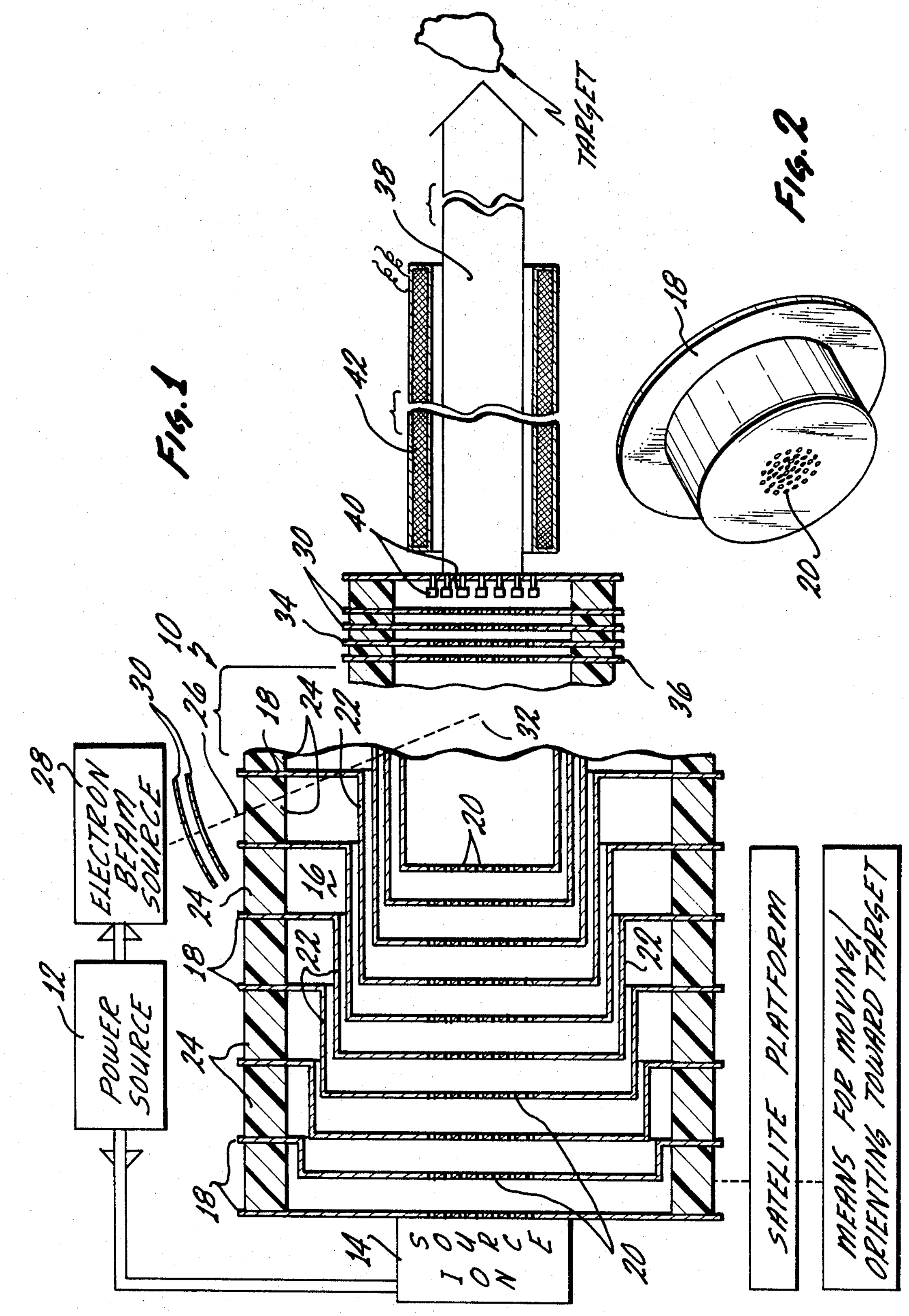
FIG. 1 is a cross section view illustrating schematically the beam forming system constructed in accordance with the teachings of the present invention.
FIG. 2 is a perspective view of one of the accelerator electrodes shown in FIG. 1 but is shown in perspective to illustrate the details thereof.

Before the more theoretical discussion hereinafter, attention is first directed to the drawings where there is shown a system 10 embodying this invention but it should also be made clear at the outset that the ion source and accelerator depicted represent only one ion acceleration technique selected to disclose the invention. Any source of intense ions and any accelerator capable of accelerating such ions to very high energies is entirely suitable. An optimum ion accelerator such as an r.f. linal is suggested. Accordingly the system 10 is disclosed as having a power supply 12 connected to a multi-filament ion beam source 14 which is in communication with a positive ion accelerator 16 comprising a plurality of circular electrodes 18 (20 or 30 in number) with circular apertures 20 and formed in a convex configuration and placed in overlapping relationship as at 22 spaced apart at their outer edges. These electrodes are electro-statically at a high voltage and are separated by high voltage insulators 24 so as to provide an overlap of the individual beamlets on the target. The decreasing diameter of the electrodes allows for close spacing of the electrodes through a telescope effect and is a convenient construction technique since the ion accelerator is electrostatic. An electron beam 26 from source 28 is produced in a separate set of accelerator-decelerator electrodes 30, shown convex near the electron beam source 28 and directed to the beam merging chamber (region) 32 defined by the aforesaid circular electrodes 18, a few of the final set are shown planar near the beam exit side of the chamber 32 with the cathode 34 of the set placed on the beam exit side of the suppressor electrode 36. The suppressor electrode 36 prevents electrons emitted from the cathode from being accelerated back into the ion source and is at a negative potential with respect to the cathode. The electron beam accelerator-decelerator electrodes and the manner in which the electrons are directed at the same intensities/velocities into the ions so as to provide a neutral particle beam 38 is discussed at length in the aforesaid winer et al patent application.

As shown in the drawings, permanent magnets 40 are provided for producing a modest magnetic field to assist in merging of the beam 38, and once merged, the beam leave the beam merging region 32 and enters an elongated axial magnetic field, generated by a solenoid 42, which compresses the beam as it is directed to an object to be destroyed.

The device as above described is housed in a satellite capable of moving within a kill radius of an object. The power supply 12 is selected to produce a high voltage pulse of a length of approximately 1 second to feed the positive ion accelerator and the beam of a desired species will be accelerated to the desired energy and the electron beam is merged with the ion beam such that the electrons have the same velocity as the ions. The electron source, the electron beam and its acceleration, and the effect of merging the electron beam of a given velocity with an ion beam of a given velocity is discussed at length in the aforesaid winer et al patent application. The high voltage in the merging beam region must be applied while the ion beam is passing through the merging beam region. The energy which the electrons must achieve is substantially below that of the ions and therefore having the electrodes 18 always energized does not represent a significant power drain.

In this system, the multi-filament ion source 14 provides ions for the accelerator 16 and the gas from the source 14 fills the beam merging region 32 where a neutral particle beam 36 is produced. It is to be understood that the beam itself is not neutral but charge neutral; that is the ions and electrons in the beam are not bound. This permits the cooling technique to be used. Since this system is to be used in space, the fact that there is no containing wall allows the gas to escape since gas in this system is undesirable. Also, the beam plasma instability which normally causes increased beam divergence is removed by not having gas load near the source exit and if the particle density in the beam is maintained sufficiently high (the dielectric constant is much greater than one) the beam will not separate or bend under the influence of the earth's magnetic field.

Alternatively, a high cross-section can be relied upon for a neutralizing reaction between ions and electrons. This will result in a beam of neutral particles, particularly useful if targets are to be destroyed at great distances. Such a reaction is the dissociative recombination reaction, such as $O_2^+ + e \rightarrow 2O° + \gamma$. The reaction is exothermic, with the cross-section varying as $K/E_i$, where K is a constant and $E_i$ is the interaction energy. The cross-section seems relatively independent of ion species, having similar values of K for $O_2^{30}$, $D_2^+$, and $H_2^+$.

If in any instance, however, the beam density is insufficient to preclude problems with the earth's magnetic field over its entire length, the use of a neutralizing reaction is warranted. The only change however, really involves the selection of an ion species and the need to merge the beam with a low interaction energy.

Making the assumption that 10 MV is an upper limit on this type of accelerator, and that 0.5 A/cm$^2$ a reasonable current density, the potential of this technique can be demonstrated with a simple computation. Choosing ion species Hg++, and assuming source efficiency for Hg++ of 60%, the useful current extract is then 0.3 A/cm$^2$. The remainder can be removed prior to acceleration to full power or simply kept with the beam. Hg++ is chosen to obtain minimum beam divergence, since this varies as 1/p, where p is the ion momentum. At 100 keV, D+, there is 0.1°=0.0017 radian divergence (no beam-plasma instability, single aperture).

$$\text{For 20MeV Hg++, } \theta = .0017/\frac{P_o}{P_{Hg}} = \frac{.0017}{2 \times 10^4} \approx 10^{-5} \text{ radians.}$$

At 10 km, this results in a beam of radius 1 meter. If the original source were 100 cm$^2$ total beam cross section, the power density would be 10 kw/cm$^2$ at 100 km from the Hg++ component alone.

Note that the invention described here avoids the necessity of forming intense negative ion beams used in competitive techniques to produce the neutral beams. It relies on positive ion systems already in high state of development.

It has been found also that the merged ion electric beam can be significantly improved in quality if the transverse temperature is reduced particularly if the electrons in the beam cannot be prevented from oscillating in the ion space charge potential well.

By way of explanation, when high-atomic number, high (Z) materials, etc, are allowed to enter a high temperature plasma, they can cause significant plasma cooling. One of the mechanisms by which this cooling occurs is known as line radiation cooling. In this mechanism, free electrons collide with the bound electrons of the high Z materials, causing excitation to higher energy levels by transfer of energy from the free electrons. The excited electrons subsequently decay, with radiative release of the excitation energy. The emitted photons leave the plasma, and the free electron temperature falls, By dynamical friction (electron drag if $Ti > Te$), the ions equilibrate with the electrons, and the plasma temperature falls. At plasma temperatures below about 1 KeV, this is a serious energy loss mechanism, and great care must be taken to maintain a "clean" plasma.

This mechanism can be used to cool the merged ion-electron beam, since this beam is, in effect, a plasma, sometimes referred to as a "synthetic plasma". Since all of the ions are high-Z, they will all contribute to the cooling effect. The power radiated per ion falls off rapidly below about 1 eV. The effect is density dependent. To facilitate the cooling, the beam is compressed by passage through an axial magnetic field generated by a long solenoid. The magnetic field will compress the beam as well as increase its transverse temperature. Line radiation will cool the free electrons, which will in turn cool the ions. When the beam emerges from the solenoid, it expands and cools by the factor it initially compressed and heated. If the compression and expansion is assumed to be adiabatric, then the amount of heating and cooling is such as to be consistent with the conservation of magnetic moments.

The net result of this compression/expansion is a beam of very high quality (low emittance) which will travel to the target without enormous spread. Indeed, the beam divergence may be reducible to one-tenth of a micro-radian for 1 GeV heavy ions (lead, uranium, mercury, etc).

With the line radiation cooling, the system has another potential use as a driver for heavy ion inertial fusion. In heavy ion inertial fusion, a beam of heavy ions is focused on a pellet of very small size containing frozen deuterium and tritium. The heavy ions deposit their energy on the outer layers of the pellet, creating inward shock waves which heat and compress the fuel, producing fusion reactions and resulting in a net energy release.

The merged beam concept can provide improvements to the basic heavy ion fusion concept in two ways:

(1) The ion beam must be space-charge neutralized in order to transport it from accelerator to target. When this is done with background electrons the potential exists for a two stream instability. A merged beam would not be subject to such an effect.

(2) Line radiation cooling will allow the beam to achieve lower emittance than the beam has at accelerator exit, enhancing beam focusing on target and increasing pellet gain.

From the foregoing it can be seen that there is disclosed an invention which will destroy targets with a particle beam from a moveable space platform and is capable of being housed in a satellite which can be brought into the kill radius of a target.

What is claimed is:

1. A method of destroying objects comprising the steps of, providing a source of positive ions in an accelerator, pulsing said accelerator with a high voltage to produce a beam of said positive ions, providing an electron beam, merging said electron beam with said ion beam in a beam merging region at the same velocity as the ions in said ion beam to form a charge neutral beam, and directing said merged beam at an object to be destroyed as said merged beam emerges from said accelerator, allowing gas from the ion source exit to escape without entering the beam merging region to reduce beam instability, and subjecting the merged beam as it exits from said accelerator to an elongated magnetic field which compresses the merged beam to control the beam temperature and to prevent divergence of the merged beam as it leaves said magnetic field and is directed to a target.

2. The method as claimed in claim 1 wherein said positive ions are derived from a high Z source for minimum beam divergence.

3. An apparatus for destroying objects with an electron-ion particle beam comprising, a positive ion source, a positive ion accelerator with a beam merging region therein and with an entrance side and an exit side, said ion source being connected to said entrance side to supply positive ions to said merging regions, means for pulsing said ion source with a high voltage to accelerate said ions to a particular velocity in said beam merging region, an electron beam source, means for accelerating said electrons and merging said electrons with said accelerated ions at the same velocity within said beam merging region to form a charge neutral particle beam, means for subjecting said merged particle beam to a magnetic field to compress said beam causing cooling thereof, said ion accelerator being defined by a plurality of overlapping electrodes of decreasing size, and pointing said accelerator toward an object to be destroyed as said particle beam emerges from the exit of said accelerator.

* * * * *